US012209940B2

(12) United States Patent
Mendelovici et al.

(10) Patent No.: US 12,209,940 B2
(45) Date of Patent: Jan. 28, 2025

(54) APPARATUS AND METHOD TO ASSESS SUB-MICRON PARTICLE LEVELS OF A SAMPLE

(71) Applicant: PERSYS TECHNOLOGIES LTD., Kiryat Gat (IL)

(72) Inventors: Leo Mendelovici, Mevaseret Ziyon (IL); Gideon Drimer, Herzeliya Pituach (IL); Yitzhak Vanek, Los Gatos, CA (US)

(*) Notice: Subject to any disclaimer, the term of this patent is extended or adjusted under 35 U.S.C. 154(b) by 264 days.

(21) Appl. No.: 17/922,654

(22) PCT Filed: Apr. 27, 2021

(86) PCT No.: PCT/IL2021/050482
§ 371 (c)(1),
(2) Date: Nov. 1, 2022

(87) PCT Pub. No.: WO2021/224906
PCT Pub. Date: Nov. 11, 2021

(65) Prior Publication Data
US 2023/0184659 A1 Jun. 15, 2023

Related U.S. Application Data

(60) Provisional application No. 63/019,453, filed on May 4, 2020.

(51) Int. Cl.
*G01N 15/06* (2024.01)
*G01N 15/10* (2006.01)
*G01N 15/00* (2006.01)

(52) U.S. Cl.
CPC ............ *G01N 15/06* (2013.01); *G01N 15/10* (2013.01); *G01N 2015/0046* (2013.01); *G01N 2015/1024* (2024.01)

(58) Field of Classification Search
None
See application file for complete search history.

(56) References Cited

U.S. PATENT DOCUMENTS

| | | | | |
|---|---|---|---|---|
| 6,408,701 B1* | 6/2002 | Fujita | ................. | G01N 1/2226 73/864.33 |
| 7,597,012 B2* | 10/2009 | Yao | .................. | B08B 3/00 73/863.21 |
| 9,752,975 B2* | 9/2017 | Mendelovici | ...... | G01N 15/0205 |
| 2011/0203931 A1* | 8/2011 | Novosselov | ......... | G01N 1/2202 250/382 |

* cited by examiner

*Primary Examiner* — Brandi N Hopkins
*Assistant Examiner* — Nigel H Plumb
(74) *Attorney, Agent, or Firm* — AlphaPatent Associates Ltd.; Daniel J. Swirsky (57) ABSTRACT

The present invention provides systems and methods for determining the cleanliness of a sample, the method including impinging high pressure fluid pulses on a sample disposed in a chamber to liberate particles therefrom and quantifying a number of the liberated particles to determine the cleanliness of the sample.

20 Claims, 6 Drawing Sheets

APPARATUS AND METHOD TO ASSESS SUB-MICRON PARTICLE LEVELS OF A SAMPLE

FIELD OF THE INVENTION

The present invention relates generally to an apparatus and method for sub-micron particle levels assessment on a sample and more particularly, to a methodology for determining cleanliness of a sample.

BACKGROUND OF THE INVENTION

Contamination detection has become increasingly important, with recent developments of industries such as the semiconductor industry, space technology, magnetic media and others. For example, in order to reliably manufacture high yield integrated circuits, the semiconductor industry has developed technology for precisely produce such products, highly stringent cleanliness as well as contamination standards must be maintained in production facilities of such devices.

In an effort to control contamination during a production process, clean rooms are frequently used. A clean room is a room in which air filtration, air distribution, utilities, materials of construction, equipment, and other operating procedures are specified and regulated to control airborne particle concentrations to meet appropriate airborne particulate cleanliness classifications. Clean rooms are used extensively in semiconductor manufacturing, biotechnology, pharmaceutical, magnetic media, aerospace and other fields that are very sensitive to environmental contamination.

It is important to monitor and maintain the cleanliness/contamination levels in the clean rooms. Further, for maintaining the cleanliness/contamination levels in the clean room, it is important to test/inspect consumables used in a clean room environment, e.g. gloves, wipes, etc. for cleanliness standard, before entering the clean room.

In addition, in the mentioned industries it is customary to carry out preventive maintenance of manufacturing tools such as sputtering, CVD, etch, and other tools. As part of this procedure, some of the machine parts as well as carriers, silicon wafers etc. require renovation and cleaning. Therefore, it is of high importance to be able to test cleanliness of the part before reinstalling it to a machine.

Conventionally, visual inspection techniques have been used with ultraviolet or oblique white light. Ultraviolet light is employed to take advantage of the fact that certain organic particles fluoresce. Alternatively, white light is shined towards a test surface at an angle to produce reflections that may be visualized. While the white light technique is slightly more sensitive than the ultraviolet technique, they both suffer from a common limitation. These visual inspection techniques only allow, at best, to detect particles larger than twenty microns. To detect particles smaller than one micron, particle counters based on laser detection system are usually utilized.

In previous inventions (U.S. Pat. No. 9,746,409 B2 and 9,752,975 B2) the description of a method and apparatus to determine cleanliness of the complete body of a sample in a convenient and effective manner as compared to other methods which only test the particles on the surface of the sample or require to wet the sample as is the case for liquid particle counters.

SUMMARY OF THE INVENTION

It is an object of some aspects of the present invention to provide improved systems and methods for determining a cleanliness of a sample.

In some embodiments of the present invention, improved methods and apparatus are provided for determining a cleanliness of a sample.

In other embodiments of the present invention, a method and system is described for determining a particle number disposed on a sample.

In accordance with the present invention, a methodology for determining the particle levels of a sample, which provides improved sensitivity and reliability, by utilizing a different approach and testing environment.

The present invention provides systems and methods for determining the cleanliness of a sample, the method including impinging high pressure fluid pulses on a sample disposed in a chamber to liberate particles therefrom and quantifying a number of the liberated particles to determine the cleanliness of the sample.

According to an embodiment of the present invention, a non-destructive method and system for determining the particle levels and thus the cleanliness of a sample, the system including;

1—a cylindrical chamber made from metal, glass (including conductive glass), plastic (including conductive plastic) or any ceramic materials;
2—a cylindrical chamber with a round or conical bottom;
3—a continuous flow of clean air into a chamber; through high purity filters;
4—the continuous flow of clean air is introduced into the chamber in such a manner it flows on the internal side walls of the chamber;
5—the continuous flow of clean air (gas) on the internal walls of the chamber creating a stream of directional air (gas) flow towards the bottom of the chamber;
6—a means to introduce a short pulse of high-pressure small volume clean air, or other gas, which impinges on the sample to agitate and remove particles;
7—a control system that sequences the pulses of high pressure air (gas) on the different sides of the three-dimensional sample;
8—a means to introduce a short pulse of high-pressure small volume clean air, where the air is ionized;
9—a means to dynamically control and maintain the pressure in the chamber when the pulse of high pressure clean air is delivered into the chamber;
10—a particle counter to collect and determine the particle amounts and size, attached into the bottom of the chamber though a piece of tubbing or an isokinetic probe;
11—a way to attach two or more particle counters to the chamber;
12—a way to attach one particle counter to the round or conical bottom of the chamber and the second (or more) on the side of the round or conical bottom of the chamber; and
13—a continuous flow of clean air (gas) on the internal walls of the chamber creating a stream of directional air (gas) flow towards the bottom of the chamber may create a "cleaner" zone near the walls as well as a "center" zone where it concentrates most of the particles removed from the sample. Thus the particle counter attached to the bottom of the chamber will register most of the particles, enhancing so the efficiency of the measurement.

Additionally, according to an embodiment of the present invention, the method further includes calculating and integrating the readings of the pulse sequence to determine the total particle levels and for different particle sizes and hence the cleanliness of the sample.

Furthermore, according to an embodiment of the present invention, the method further includes the combination of the results of the various particle counters into one set of data.

Furthermore, according to an embodiment of the present invention, the method further includes statistical methods to enhance the reliability of the readings.

Furthermore, according to an embodiment of the present invention, the method further includes analyzing the trapped particles to determine nature and chemical composition of the impurities particles.

Additionally, according to an embodiment of the present invention, the sample is selected from at least one of a metal part, quartz part, ceramic part, and plastic part.

Further additionally, according to an embodiment of the present invention, the sample is selected from at least one of a machine part, a tool, a clean room gown, a clean room glove a clean room towel, a silicon wafer, and a magnetic media disk.

Furthermore, according to an embodiment of the present invention, wherein the sample, once tested, is ready for use without any additional processing following the method (Non-Destructive Test).

Thus according to the embodiment of the present invention, the apparatus where the cylindrical chamber has:
  a) An opening or a door to introduce the sample into the chamber; (typically disposed at the top of the chamber);
  b) a sample holder or an integrated sample fixture for holding both a sample in the chamber and providing a high velocity air stream;
  c) a set of nozzles to provide a continuous flow of clean air (gas) on the internal walls of the chamber stream of directional air flow towards the bottom of the chamber;
  d) the continuous flow of clean air (gas) may be delivered by various means such an air compressor equipped with proper filtration units, a reservoir of air (gas) or liquefied gas, a blower, or any other similar means;
  e) A blower, typically being of the high-pressure type;
  f) At least one HEPA or ULPA filter unit with a blower to provide clean air (gas) disposed on a side of the cylindrical chamber to flush and clean the chamber prior to testing;
  g) a set of nozzles activated by a set of electrically controlled valves to provide a stream of high velocity clean air or short pulses of high velocity clean air over the sample. The air to the nozzles is provided through in-line high purity filter units;
  h) a means to generate vibrations on the walls or other units attached to the chamber to remove particles adhered to the chamber;
  i) a means to generate vibrations on the walls or other units attached to the chamber where the means is based on ultrasonic energy;
  j) a means to generate ionizing air such as an alpha rays emitter;
  k) a particle counter, coupled with the chamber, configured to count particles passed in a stream of air from the sample to the particle counter;
  l) a set of one or more particle counters, coupled with the chamber, configured to count particles passed in a stream of air from the sample to the particle counters;
  m) a programmable controller or computer for operating the apparatus;
  n) a programmable controller or computer to combine the results of the various particle counters attached to the chamber;
  o) a programmable controller or computer to perform mathematical and or statistical calculation of the particle counter results; and
  p) a programmable controller or computer with feedback capabilities to adjust interactively the testing method.

Additionally, according to an embodiment of the present invention, the nozzle set includes nozzles connected to an in-line high purity filter units.

Furthermore, according to an embodiment of the present invention, the nozzle set includes a shower head connected to an in-line high purity filter unit.

Moreover, according to an embodiment of the present invention, the nozzle set includes a nozzle and a shower head connected to an in-line filter unit.

Additionally, according to an embodiment of the present invention, the chamber further includes a detachably unit equipped with a carbon sticker located in a microscope holder type for trapping particles released from the sample due to the stream of air by applying a vacuum through the unit.

According to an embodiment of the present invention, the filter or carbon sticker unit is removable for analyzing the chemical composition of trapped particles by means of SEM/EDS, XRF, or other suitable means.

Additionally, according to an embodiment of the present invention, the particle counters are a laser type particle counter.

Further, the present invention may provide a number of advantages depending on its particular configuration. First, embodiments of the present invention provide a system and a method for Non-Destructive testing cleanliness of samples. Further, embodiments of the present invention provide a system and a method for testing cleanliness of equipment parts and other samples, which may work in a clean room environment only after a cleanliness testing procedure has been carried out. Further, the present invention facilitates directly packing and shipping the samples, if they meet the cleanliness criteria. Hence, they may not require additional cleaning or drying procedures such as used in liquid particle counters (LPC), surface particle counters, or similar equipment.

Furthermore, the present invention may include a means for automatic loading and unloading samples. This device may include as required special fixtures for various types of samples.

Furthermore, the present invention utilizes a conventional particle counter for determining cleanliness of a sample. Hence, the present invention provides a convenient, simple, and effective method to determine cleanliness of the sample.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing alone or in combination, one or more of the features set forth above or described in detail below.

EMBODIMENTS

1. A method for determining the level of particles on the surface of a sample and hence the cleanliness of a sample, the method comprising:

a. continuous flow of clean air is introduced into the chamber in such a manner it flows on the internal side walls of the chamber
b. impinging high pressure air (gas) pulses on the sample, disposed in a chamber to release particles therefrom; and
c. quantifying a number of the released particles to determine the cleanliness of the sample utilizing one or more particle counters.

2. A method according to embodiment 1, wherein said impinging step comprises providing an air (gas) under a pressure of 5-15 bar at an air (gas) velocity of 400-2000 m/s at the exit of the nozzle orifice 3. A method according to embodiment 2, wherein said providing step comprises providing said air from multiple nozzles disposed at different locations within the circular chamber.

4. A method according to embodiment 3, wherein said two or more nozzles are disposed at a lower side of the chamber and at a vertical side of the circular chamber, at an angle of 60-180 degrees.

5. A method according to embodiment 3, wherein two or more nozzles are disposed at perimeter of the circular chamber and at different heights on a vertical side of the chamber, at an angle of 60-180 degrees between the nozzles 6. A method according to embodiment 3, wherein said air is ionized.

7. A method according to embodiment 1, wherein a means to generate vibrations on the walls or other units attached to the chamber to remove particles adhered to the chamber 8. A method according to embodiment 7, where the means to generate vibrations on the walls or other units attached to the chamber is based on ultrasonic energy 9. A method according to embodiment 1, wherein said quantifying step comprises collecting said released particles for further analysis by any suitable means such as SEM/EDS, XRF, etc.

10. A method according to embodiment 1, wherein said continuous flow of clean air flows spirally around the internal walls of said chamber.

11. A method according to embodiment 1, wherein said sample is selected from the group consisting of a metal part, glass, quartz part, ceramic part, and plastic part and materials among others such as elastomers, fluorocarbon polymers and combinations thereof.

12. A method according to embodiment 1, wherein said sample is selected from the group consisting of a machine part, a tool, a clean room gown, a clean room glove a clean room towel, a clean room paper, a silicon wafer, and a magnetic media disk.

13. A method according to embodiment 1, wherein said method is a non-destructive method.

14. A system for determining a quantity of particles on a surface of a sample to determine its cleanliness, the system comprising:
a. a cylindrical chamber and a closable lid;
b. at least one clean gas port for continuously introducing a flow of pre-filtered clean air under pressure into the chamber in such a manner that said air flows spirally on the internal side walls of the cylindrical chamber;
c. a sample holder for holding the sample;
d. at least one nozzle in fluid connection with a clean air provision unit, said at least one nozzle configured to provide high pressure pulses of clean air onto the sample, thereby releasing particles therefrom; and
e. at least one particle counter in fluid connection with a vacuum pump, the at least one particle counter configured to receive said particles from said sample and further to quantify a number of said particles to determine said cleanliness of said sample.

15. A system according to embodiment 14, wherein said at least one clean gas port is configured to provide air at a pressure of in a range of 5-20 bar, at an air velocity of 400-2000 m/s at an exit of a nozzle orifice.

16. A system according to embodiment 14, wherein said gas inlet comprises at least two nozzles, disposed at different locations within said chamber.

17. A system according to embodiment 16, wherein said at least two nozzles comprise one nozzle disposed at a lower side of the chamber and at least another nozzle disposed at a vertical side of the chamber, at an angle of 60-180 degrees.

18. A system according to embodiment 16, wherein said at least one nozzle comprises two nozzles disposed on an inner perimeter of the cylindrical section at different heights on a vertical side of the chamber, with an angle of 60-180 degrees between the two nozzles.

19. A system according to embodiment 14, wherein said air comprises ionized air.

20. A system according to embodiment 14, further comprising a vibration generating apparatus, disposed on at least one of a wall of the chamber and on other units attached to the chamber, the vibration generating apparatus configured to release particles adhered to the chamber.

21. A system according to embodiment 20, wherein said vibration generating apparatus comprises an ultrasonic energy provision apparatus.

22. A system according to embodiment 14, wherein said particle collection unit is in fluid connection with at least one of an SEM, EDS and XRF apparatus for particle analysis.

23. A system according to embodiment 14, wherein said at least one clean gas port is disposed to induce said flow of said clean air to move spirally around an inner surface of walls of said chamber.

24. A system according to embodiment 14, wherein said sample is selected from the group consisting of a metal part, glass, quartz part, ceramic part, and plastic part and materials among others such as elastomers, fluorocarbon polymers and combinations thereof.

25. A system according to embodiment 14, wherein said sample is selected from the group consisting of a machine part, a tool, a clean room gown, a clean room glove a clean room towel, a clean room paper, a silicon wafer, and a magnetic media disk.

26. A system according to embodiment 14, wherein said system is configured to collect said particles non-destructively.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

Figure 1A:
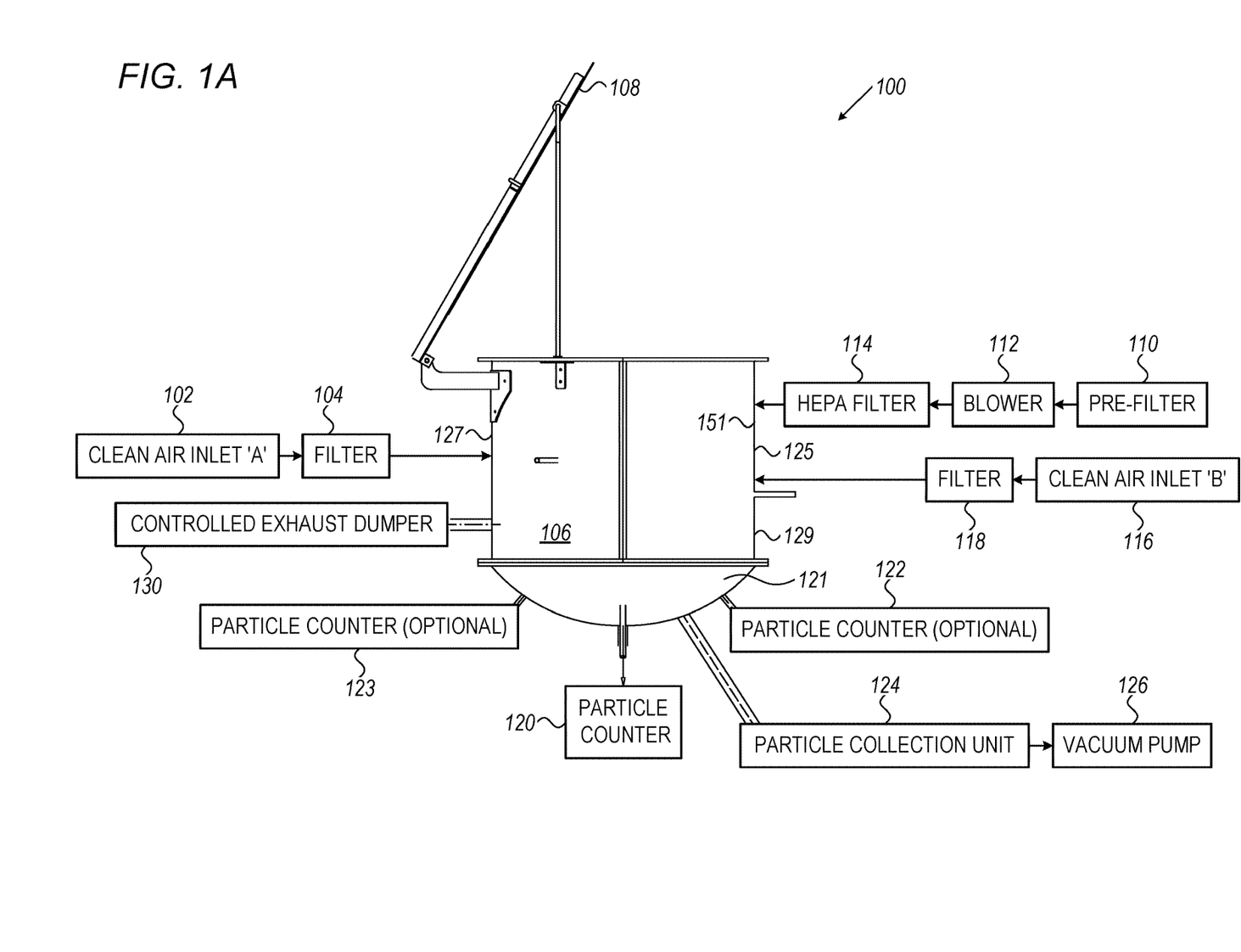
FIG. 1A is a simplified pictorial illustration showing a side view of a system for quantifying sub-micron particles present in a sample, in accordance with an preferred embodiment of the present invention.

Reference is now made to FIG. 1A, which is a simplified pictorial illustration showing a side view of a system 100 for quantifying sub-micron particles present in a sample, in accordance with an preferred embodiment of the present invention.

FIG. 1A shows schematically a chamber 106 with all the units, which are connected to it, including:

A flap (door) 108 or lid, that allows access into the chamber. The opening of the flap may be activated manually or automatically. The chamber comprises several HEPA/ULPA filter unit components 110, 104 and 118, 114 for filtering air/gases entering the chamber. The system further comprises a controlled air exhaust 130 activated mechanically by a system of springs (not shown), or similar devices, or electronically by pressure sensors (not shown).

The system further comprises at least one particle counter 120 connected to the round or conical bottom 121 of the chamber 106.

Additional (optional) particle counters 122, 123 are connected to the side of the round or conical bottom of the chamber 106. Typically at least one particle counter is located at to the bottom of the chamber and at least one to a cylindrical side wall 125 thereof.

At least one clean air inlet 102, 116 is configured to allow air to flow on the inner walls 151 (FIG. 1B) of the chamber though sub-micron filters 104, 118, typically having a gauge of 0.03 μm (or less) at inlets A & B respectively on the upper side 127 and lower side 129 of the chamber. The air may enter the chamber in a continuous, semi-continuous or pulsed fashion. According to some preferred embodiments, the air is passed through two or more nozzles 130 (FIG. 1F) at different angles to the sides of the chamber.

An optional particle collection unit 124, equipped with a vacuum pump 126 to collect and further determine the nature and chemical composition of the particles.

Figure 1B:
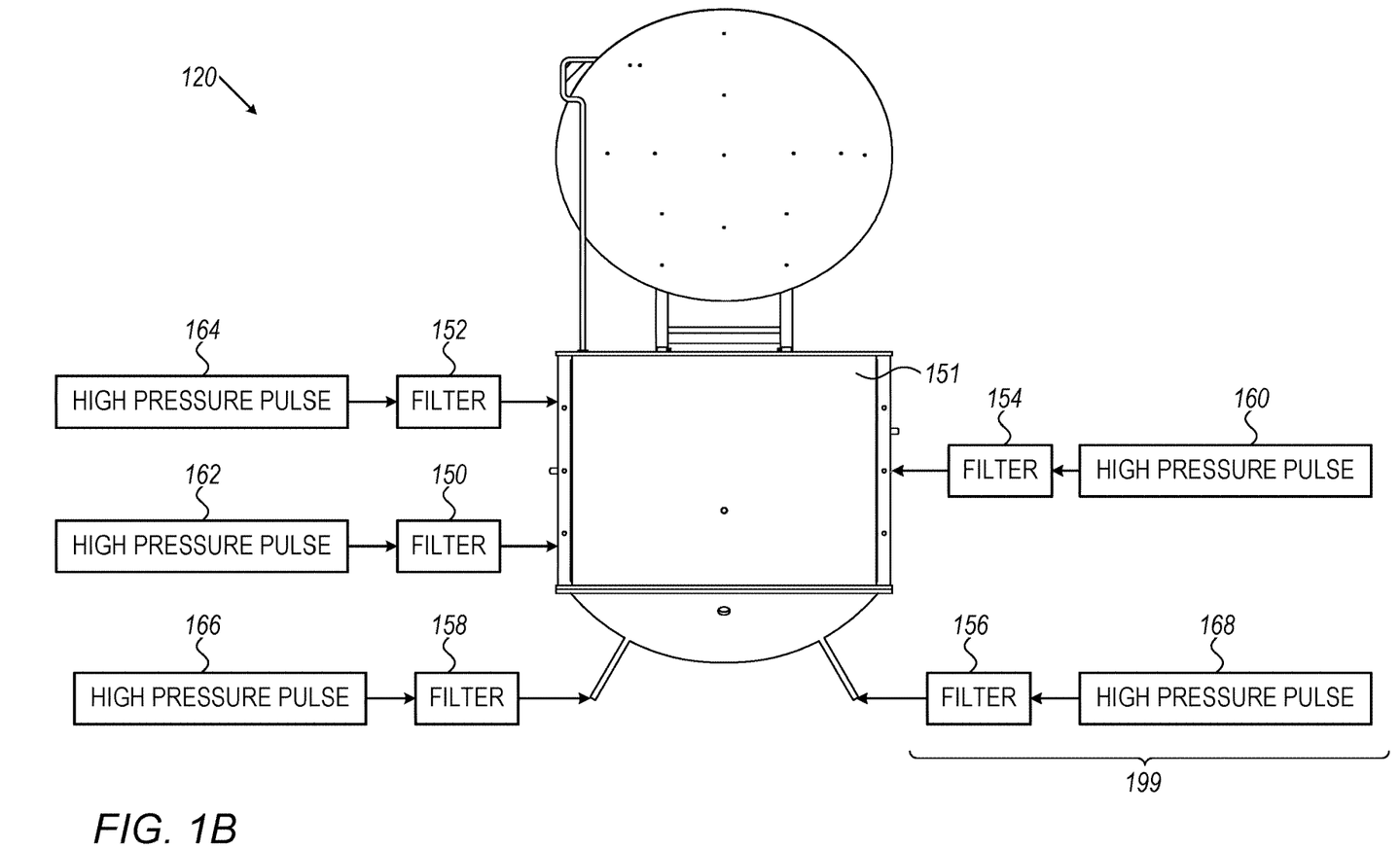
FIG. 1B is a simplified pictorial illustration showing a vertical cross-sectional view of a system for measuring and quantifying sub-micron particles present in a sample, in accordance with an embodiment of the present invention.

Turning to FIG. 1B, there is seen a simplified pictorial illustration showing a vertical cross-sectional view 120 of system 100 for analyzing quantifying sub-micron particles present in a sample, in accordance with an embodiment of the present invention.

FIG. 1B shows three high pressure pulse units 160, 162 and 164, for providing airflow to the chamber. Further details of the high pressure air units 199 appear in FIG. 1D.

These are connected to the sides of the cylindrical chamber at different heights via respective filter units 154, 150 and 152. Additionally, the system comprises of the two high pressure air pulse units 166, 168, connected to the bottom 121 of the cylindrical chamber, each via its respective filter 158, 156, respectively. These two high pressure air pulse units 166, 168 are for providing pulsed air under high pressure to a sample (not shown). Further details of the high pressure air pulse units 199 appear in FIG. 1D.

Additional high pressure units may be attached to the chamber 106 at different locations, not shown in the Figure.

Figure 1C:
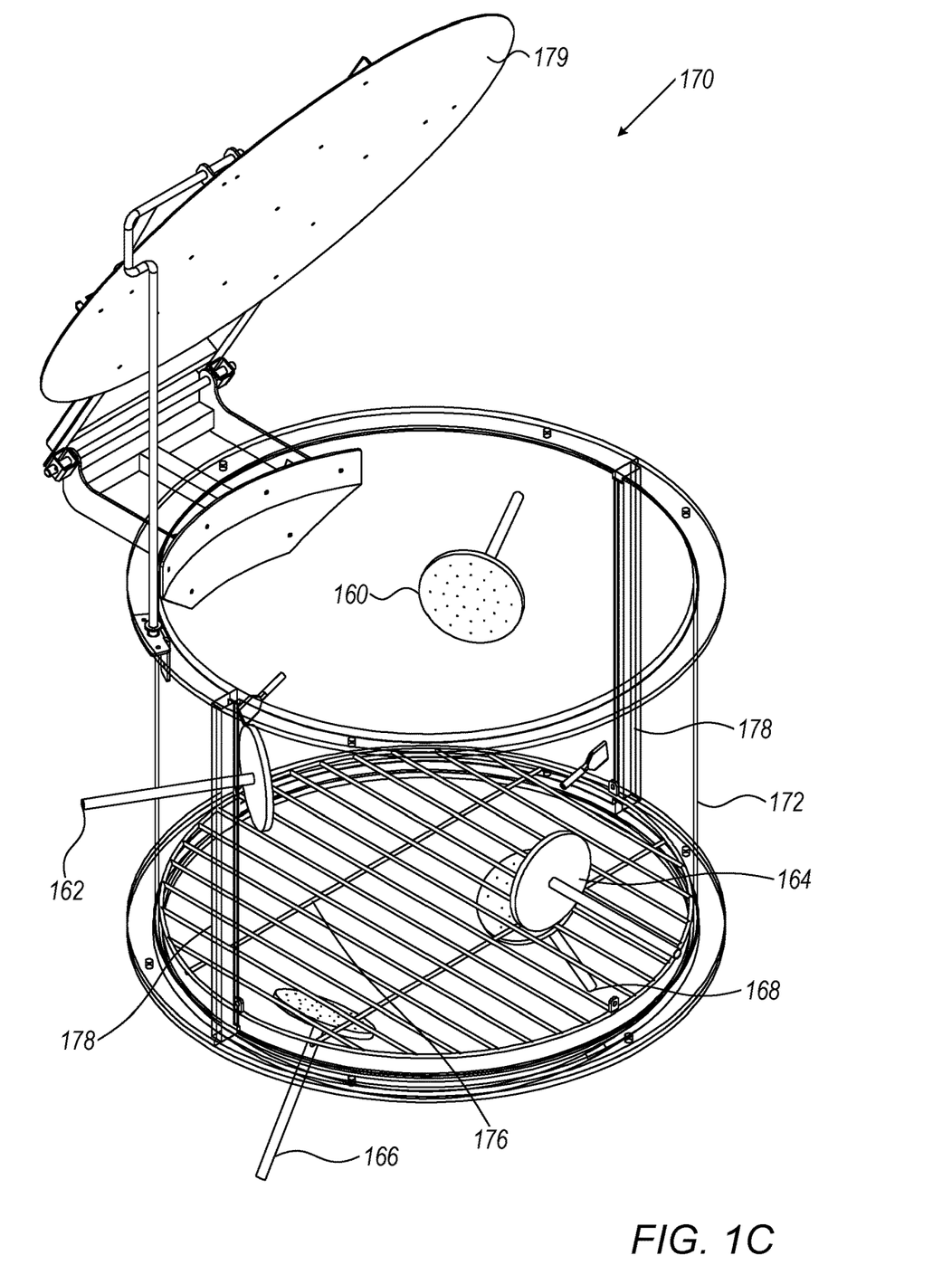
FIG. 1C is a simplified pictorial illustration showing a three-dimensional perspective view of a system for measuring and quantifying sub-micron particles present in a sample, in accordance with an embodiment of the present invention.

FIG. 1C is a simplified pictorial illustration showing a three-dimensional perspective view 170 of a system for quantifying sub-micron particles present in a sample, in accordance with an embodiment of the present invention. FIG. 1C is a three dimensional pictorial view 170 of chamber 106 showing the suggested location of the nozzles (showers) attached to the high-pressure pulse units 160, 162, 164 (FIG. 1C). Three showers are located on the sides of the chamber 172 and two nozzles 166, 168 on the bottom. The sample holding apparatus further comprises a grid 176, vertical support elements 178 and a lid 179.

Figure 1D:
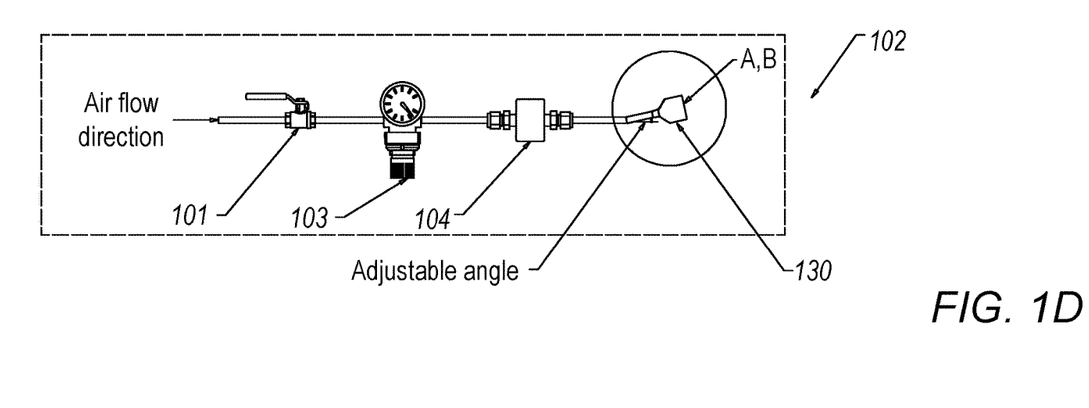
FIG. 1D is a simplified diagram of a clean air inlet in accordance with an embodiment of the present invention.

FIG. 1D is a schematic diagram of the clean air inlet unit 102 showing a valve 101, a pressure regulator 103 a sub-micron filter 104 and a rectangular nozzle 130 attached to the chamber at inlets A & B. Both the valve 101 and the pressure regulator 103 may be of the mechanical type or electrical controlled type. All valves described in the present invention may be manual and/or electrical.

Figure 1E:
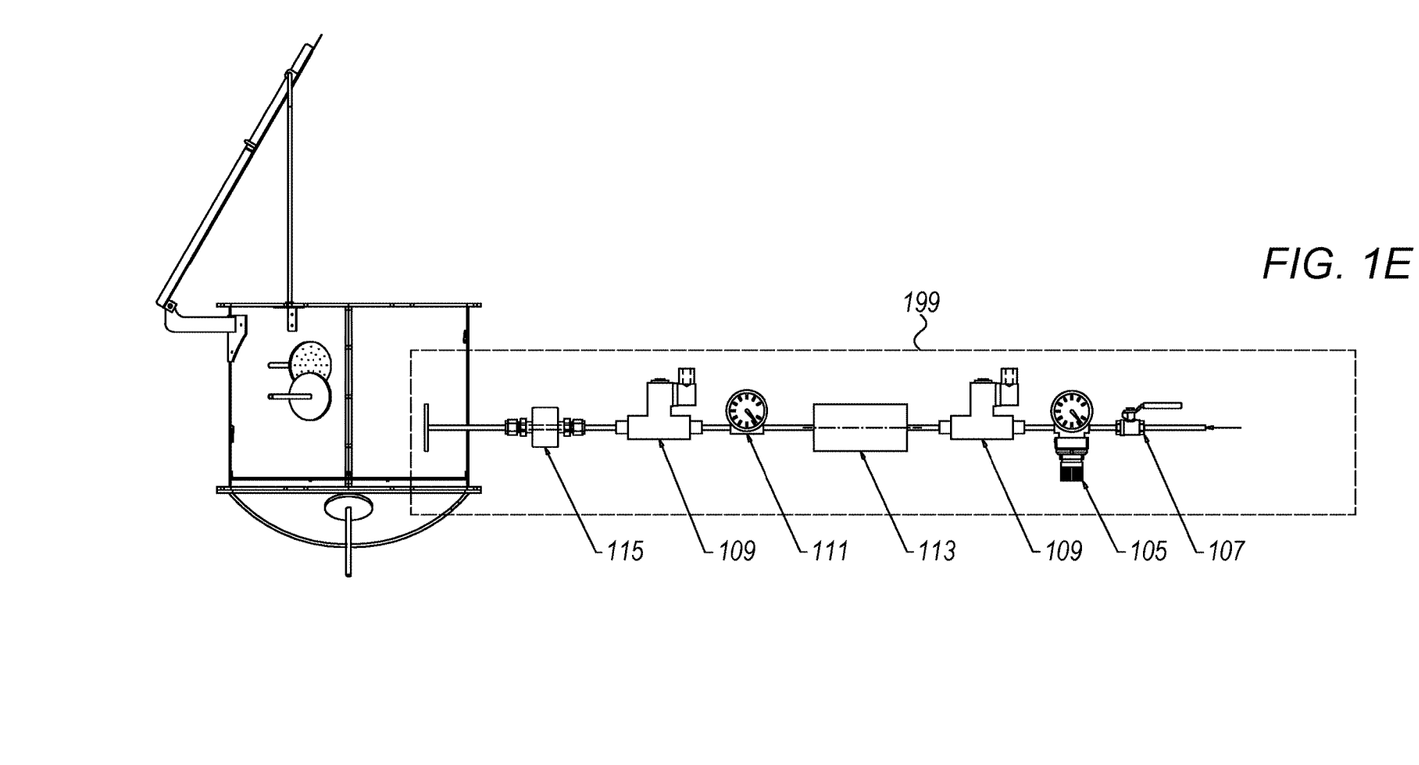
FIG. 1E is a simplified diagram of a high pressure pulse system in accordance with an embodiment of the present invention.

FIG. 1E is a schematic diagram of the high-pressure pulse unit 199 showing a valve 107, a pressure regulator 105, electrical controlled valves 109, a reservoir (100-500 ml) 113 a sub-micron filter 115 attached to the five nozzles (showers) and attached to the chamber 106. Both the valve 107 and the pressure regulator 105 may be of the mechanical type or electrically-controlled type.

Figure 2:
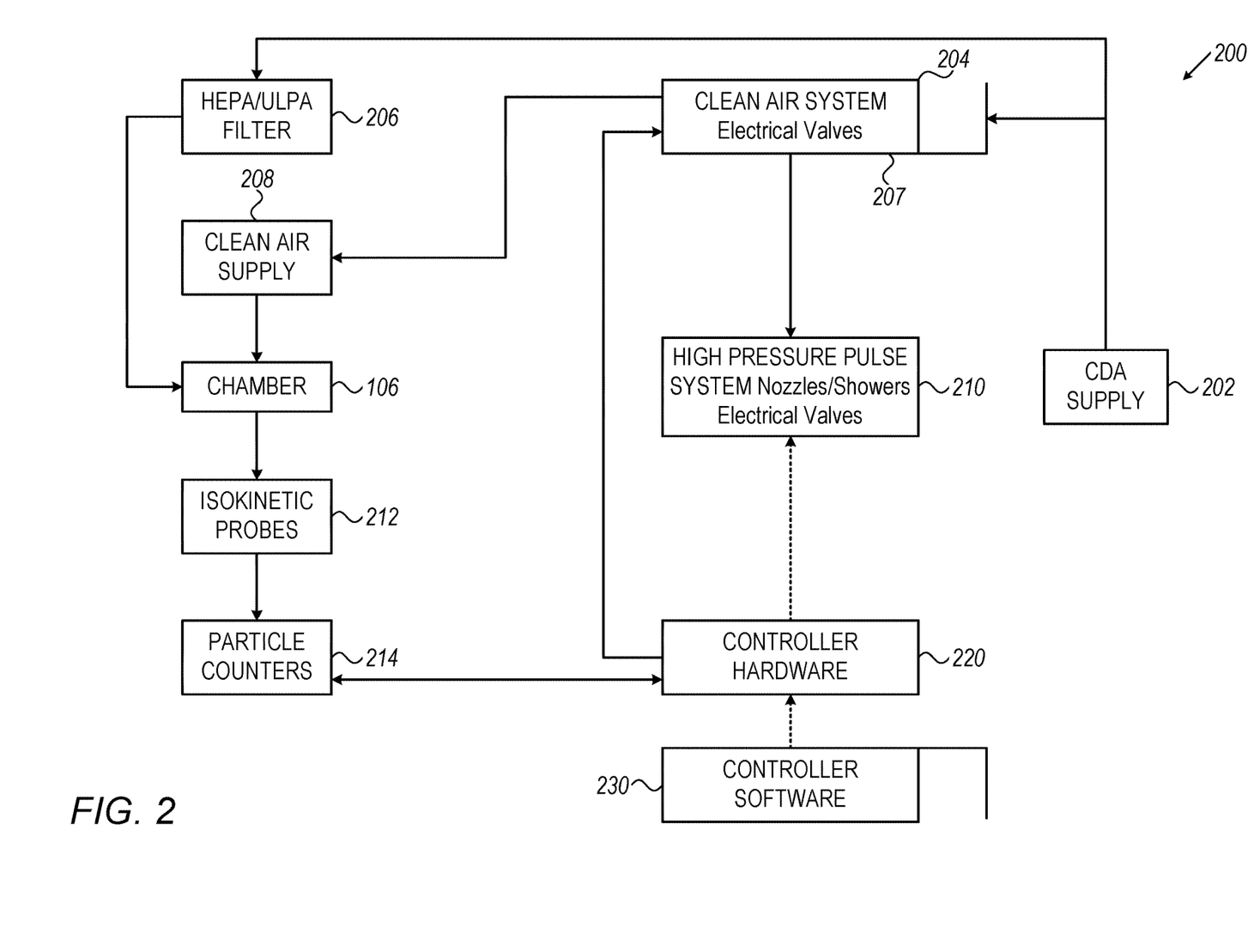
FIG. 2 is a simplified schematic block drawing of a system for analyzing sub-micron particles, present in a sample, in accordance with an embodiment of the present invention.

Reference is now made to FIG. 2, which is a simplified schematic block drawing of a system 200 for quantifying sub-micron particles, released from a sample, in accordance with an embodiment of the present invention. The block diagram depicted in FIG. 2 shows the main components of the system.

The system typically comprises a cylindrical chamber 106 made of stainless steel, or other metal such as aluminum, or conductive glass/plastic, or any other appropriate material, a clean air unit 204 equipped with filters and electrical valves 207 controlled by a programmable controller or computer 220 and appropriate software 230. The system further comprises a source of air 202 that may be a compressor, a compressed air or other gas reservoir, a liquefied nitrogen or air reservoir, each of these being equipped with a suitable filtration units, valves, pressure regulators etc. (not shown).

The clean air unit 204 supplies clean air to the clean air supply unit 208 that supplies clean air to the chamber 106 that flows on the chamber walls as shown in FIG. 1A (locations A & B).

Clean air unit 204 also supplies clean air to the high pressure pulse system 210 equipped with nozzles, showers and similar accessories to generate short pulses of high velocity air/gas to impinge upon the sample.

The system typically further comprises a HEPA/ULPA filter unit 206 that receives air/gas from the supply system 202 that is used for flushing and cleaning the chamber 106 before the measurements and one or more particle counters 214 attached to the chamber 106 through isokinetic probes 212.

According to some embodiments, the entire operation of the chamber, air inlets, air flow rates, nozzles, meters, pumps and flow regulators are computer controlled. Typically the computer/processor 220 performs ongoing calculations to optimize air flow rates and to control the system working parts.

Figure 3:
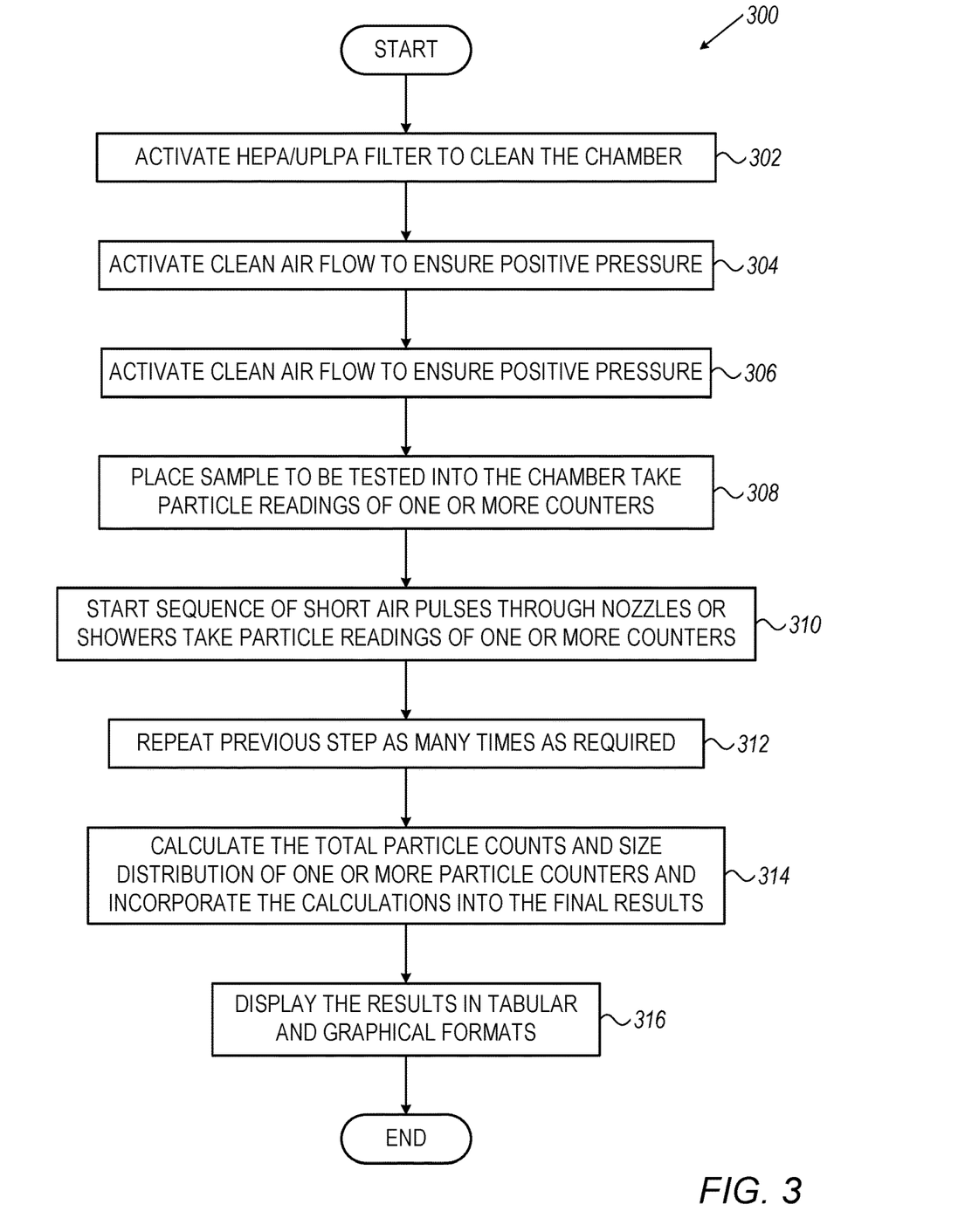
FIG. 3 is a simplified flow chart of a method for analyzing sub-micron particles, present in a sample, in accordance with an embodiment of the present invention. In all the figures similar reference numerals identify similar parts.

Turning to FIG. 3, there is seen a simplified flow chart of a method 300 for quantifying sub-micron particles, released from a sample, in accordance with an embodiment of the present invention. Cleaning Chamber Step 302—Before a working session or if the cleanliness of the chamber 106 is so required, the HEPA/ULPA filter unit 206 is activated to flush, clean and prepare the chamber for testing.

Activating clean air flow step 304—The clean air unit 208 is activated to ensure positive pressure in the chamber 106 at inlet 'A'.

Further activate clean air flow step 306—The clean air unit 208 is activated to ensure positive pressure in the chamber 106 at inlet 'B'. This is performed to avoid entry of exterior air into the chamber. According to some embodiments, the air flow is in a downwards spiral motion, largely around the inner sides of the chamber. The air flow may be pulsed air, controlled by a controller/processor/computer such that the air flow or air stream is focused to prevent particles from escaping upwards. This methodology enables concentration of the particles into a small volume of air. The chamber is designed to have no electrostatic charge (such as from stainless steel, plastic, glass, aluminum and combinations thereof).

Sample delivery step 308—Open the flap (door) 108 and place the sample (not shown) to be tested, into the chamber and take readings of the particle counter or particle counters.

Pulsing air step 310—Start the sequence of short pulses of high-velocity air (gas) to impinge upon the sample and remove particles and taking readings of the particle counter or particle counters.

Repeating pulsing air step 312—Step 310 is repeated as many times as required by the programed testing sequence determined by the user according to the nature and type of the tested sample.

All steps of the method described above as well as calculating total particle steps 314 and a display results step 316. These two steps are controlled and performed by a previously programed testing sequence ("recipe") as created previously by the user established according to the sample to be tested.

For example, here are some working, non-limiting exemplary parameters to be measured: directed pulses of air, air velocity m/s, air flow l/s, direction of flow and number of air inlets to chamber. In one example with two air inlets the exemplary parameters appear below.

| 1- CLEAN AIR FLOW: | | |
| --- | --- | --- |
| FLOW RANGE= | 2-6 | CFM |
| Velocity @ nozzle exit= | 1000-3000 | cm/sec |
| 2- AIR PULSE FLOW: | | |
| container range volume | 100-500 | $cm^3$ |
| # orifices range | 20-50 | |
| pressure range | 5-15 | bar |
| flow range @ 1 bar | 10,000-30,000 | $cm^3$/sec |
| total velocity/pulse range | 20,000-60,000 | cm/sec |
| velocity @ orifice exit (range) | 40,000-200,000 | cm/sec |

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes may be applied to the embodiments of the invention as hereinbefore described without departing from its scope, defined in and by the appended claims.

The invention claimed is:

1. A method for determining a quantity of particles on a surface of a sample, the method comprising:
   a. continuously introducing a flow of clean air or other gas into a chamber in such a manner that said air flows in a downwards spiral motion on an internal side walls of the chamber;
   b. impinging high pressure air or other gas pulses on the sample, disposed in said chamber to release particles therefrom; and
   c. quantifying a number of the released particles to determine the cleanliness of the sample using one or more particle counters, wherein said downwards spiral motion prevents said particles from escaping upwards.

2. A method according to claim 1, wherein said impinging step comprises providing air or another gas at a pressure in a range of 5-20 bar of said air or said other gas at a velocity of 400-2000 m/s at an exit of a nozzle orifice.

3. A method according to claim 2, wherein said impinging step comprises providing said air from two or more nozzles disposed at different locations within said chamber.

4. A method according to claim 3, wherein said two or more nozzles are disposed at the lower side of the chamber, at an angle of 60-180 degrees.

5. A method according to claim 3, wherein said two or more nozzles are disposed at perimeter of the circular chamber and at different heights on a side of the chamber, at an angle of 60-180 degrees between the nozzles.

6. A method according to claim 3, wherein said air comprises ionized air.

7. A method according to claim 1, further comprising generating vibrations on at least one of a wall of the chamber and on other units attached to the chamber thereby removing particles adhered to the chamber.

8. A method according to claim 7, wherein said generating vibrations step is performed utilizing ultrasonic energy.

9. A method according to claim 1, wherein said quantifying step comprises collecting said released particles for further analysis by at least one of SEM, EDS and XRF.

10. A method according to claim 1, wherein said continuous flow of clean air moves spirally around an inner surface of walls of said chamber enables concentration of the particles into a small volume of air.

11. A method according to claim 1, wherein said sample is selected from the group consisting of a metal part, glass, quartz part, ceramic part, and plastic part and materials among others such as elastomers, fluorocarbon polymers and combinations thereof.

12. A method according to claim 1, wherein said sample is selected from the group consisting of a machine part, a tool, a clean room gown, a clean room glove a clean room towel, a clean room paper, a silicon wafer, and a magnetic media disk.

13. A method according to claim 1, wherein said method is a non-destructive method.

14. A system for determining a quantity of particles on a surface of a sample to determine its cleanliness, the system comprising:
  a. a cylindrical chamber and a closable lid;
  b. at least one clean gas port controlled by a controller/processor/computer for continuously introducing a flow of pre-filtered clean air under pressure into the chamber in such a manner that said air flows spirally on the internal side walls of the cylindrical chamber, in a downwards spiral motion, adapted to prevent said particles from escaping upwards;
  c. a sample holder for holding the sample;
  d. at least one nozzle in fluid connection with a clean air provision unit, said at least one nozzle configured to provide high pressure pulses of clean air onto the sample, thereby releasing particles therefrom; and
  e. at least one particle counter in fluid connection with a vacuum pump, the at least one particle counter configured to receive said particles from said sample and further to quantify a number of said particles to determine said cleanliness of said sample.

15. A system according to claim 14, wherein said at least one clean gas port is configured to provide air at a pressure of in a range of 5-20 bar, at an air velocity of 400-2000 m/s at an exit of a nozzle orifice.

16. A system according to claim 14, wherein said gas inlet comprises at least two nozzles, disposed at different locations within said chamber.

17. A system according to claim 16, wherein said at least two nozzles comprise one nozzle disposed at a lower side of the chamber and at least another nozzle disposed at a vertical side of the chamber, at an angle of 60-180 degrees.

18. A system according to claim 16, wherein said at least one nozzle comprises two nozzles disposed on an inner perimeter of the cylindrical section at different heights on a vertical side of the chamber, with an angle of 60-180 degrees between the two nozzles.

19. A system according to claim 14, wherein said air comprises ionized air.

20. A system according to claim 14, further comprising a vibration generating apparatus, disposed on at least one of a wall of the chamber and on other units attached to the chamber, the vibration generating apparatus configured to release particles adhered to the chamber.

* * * * *